(12) United States Patent
Liu et al.

(10) Patent No.: US 10,432,962 B1
(45) Date of Patent: Oct. 1, 2019

(54) ACCURACY AND LOCAL SMOOTHNESS OF MOTION VECTOR FIELDS USING MOTION-MODEL FITTING

(71) Applicant: PIXELWORKS, INC., Portland, OR (US)

(72) Inventors: Guodong Liu, Shanghai (CN); Bob Zhang, Santa Clara, CA (US); Yue Ma, Pleasanton, CA (US); Junhua Chen, Shanghai (CN); Neil Woodall, Newport Beach, CA (US)

(73) Assignee: PIXELWORKS, INC., Portland, OR (US)

( * ) Notice: Subject to any disclaimer, the term of this patent is extended or adjusted under 35 U.S.C. 154(b) by 3 days.

(21) Appl. No.: 15/920,359

(22) Filed: Mar. 13, 2018

(51) Int. Cl.
*H04N 19/179* (2014.01)
*H04N 19/52* (2014.01)
*H04N 19/597* (2014.01)
*H04N 19/176* (2014.01)

(52) U.S. Cl.
CPC ........... *H04N 19/52* (2014.11); *H04N 19/176* (2014.11); *H04N 19/597* (2014.11)

(58) Field of Classification Search
CPC ..... H04N 19/176; H04N 19/52; H04N 19/597
USPC .................................................. 375/240.02
See application file for complete search history.

(56) References Cited

U.S. PATENT DOCUMENTS

| 2011/0176615 | A1* | 7/2011 | Lee | H04N 19/52 |
| | | | | 375/240.16 |
| 2013/0294514 | A1* | 11/2013 | Rossato | H04N 19/139 |
| | | | | 375/240.16 |
| 2015/0010062 | A1* | 1/2015 | Gokhale | H04N 19/61 |
| | | | | 375/240.03 |
| 2017/0337711 | A1* | 11/2017 | Ratner | H04N 19/176 |
| 2018/0139451 | A1* | 5/2018 | Maier | H04N 19/176 |
| 2019/0028703 | A1* | 1/2019 | Tamse | H04N 19/176 |
| 2019/0037231 | A1* | 1/2019 | Ikai | H04N 19/513 |
| 2019/0045214 | A1* | 2/2019 | Ikai | H04N 19/573 |

* cited by examiner

*Primary Examiner* — Dominic D Saltarelli
(74) *Attorney, Agent, or Firm* — Miller Nash Graham & Dunn LLP

(57) ABSTRACT

A method of producing video data includes receiving, at a processor, a current frame of image data in a stream of frames of image data, dividing a current frame of image data into blocks, identifying a current block and defining a neighborhood of blocks for the current block, generating at least one initial motion vector for each block, using the initial motion vector for current block and an initial motion model to calculate a weight for each initial motion vector in the neighborhood based on a difference between initial motion vector for the current block and the initial motion vector for at least one other block from the current block in the neighborhood and differences in the image data between the current block and the other blocks in the neighborhood, using the weights for each initial motion vector to generate coefficients for a refined motion model, refining the initial motion vector for the current block according to the refined motion model to produce a refined motion vector, using the refined motion vector and the pixels in the stream of frames to produce at least one of adjusted pixels and new pixels, and displaying the at least one of adjusted pixels and new pixels on a display.

16 Claims, 3 Drawing Sheets

ACCURACY AND LOCAL SMOOTHNESS OF MOTION VECTOR FIELDS USING MOTION-MODEL FITTING

BACKGROUND

Digital image processing may include processing of frames of image data for such applications as frame interpolation, which inserts new frames between existing frames of image data; noise reduction, which adjusts existing pixels; or scaling which creates new pixels. In frame interpolation, for example, to ensure that objects moving in an original frame prior to the new frame moves smoothly in the new frame of image data, most processes rely on motion vectors. The data in the new frame is created according to the motion vectors so motion remains smooth across the existing and new frames.

The process is repeated for each new frame of image data, and each new frame of image data has a pre-existing frame of image data before it in time, and a pre-existing frame of image data after it in time, referred to as the previous and future frames. The motion vectors between the previous and future frame define the motion for the new frame and the collection of them for a frame may be referred to as the motion vector field. Motion vector fields may be used in other applications, as mentioned above.

When the motion vector field results from true-motion estimation models, such as 3D recursive analysis, the motion vector field has poor accuracy and may oscillate in a local neighborhood. This results from updating of the motion vectors that occurs as the process seeks the most accurate motion vector and the motion vector field converges. A need exists for accurate and locally smooth motion vectors, or obvious artifacts such as object/background breakage, in which an object and its background do not match, ghosts in the resulting image, etc. occur.

DETAILED DESCRIPTION OF THE EMBODIMENTS

Embodiments here use a weighted motion model fitted to the image data in a local window to remove oscillation of motion vectors and improve their accuracy. This will be referred to here as motion vector (MV) smoothing, not to be confused with other smoothing processes used in video processing. The process selects one motion model from several candidates to improve the quality of the image data in the local window. The selection may be based on user selections or on the motion vector field itself, among other factors.

Figure 1:
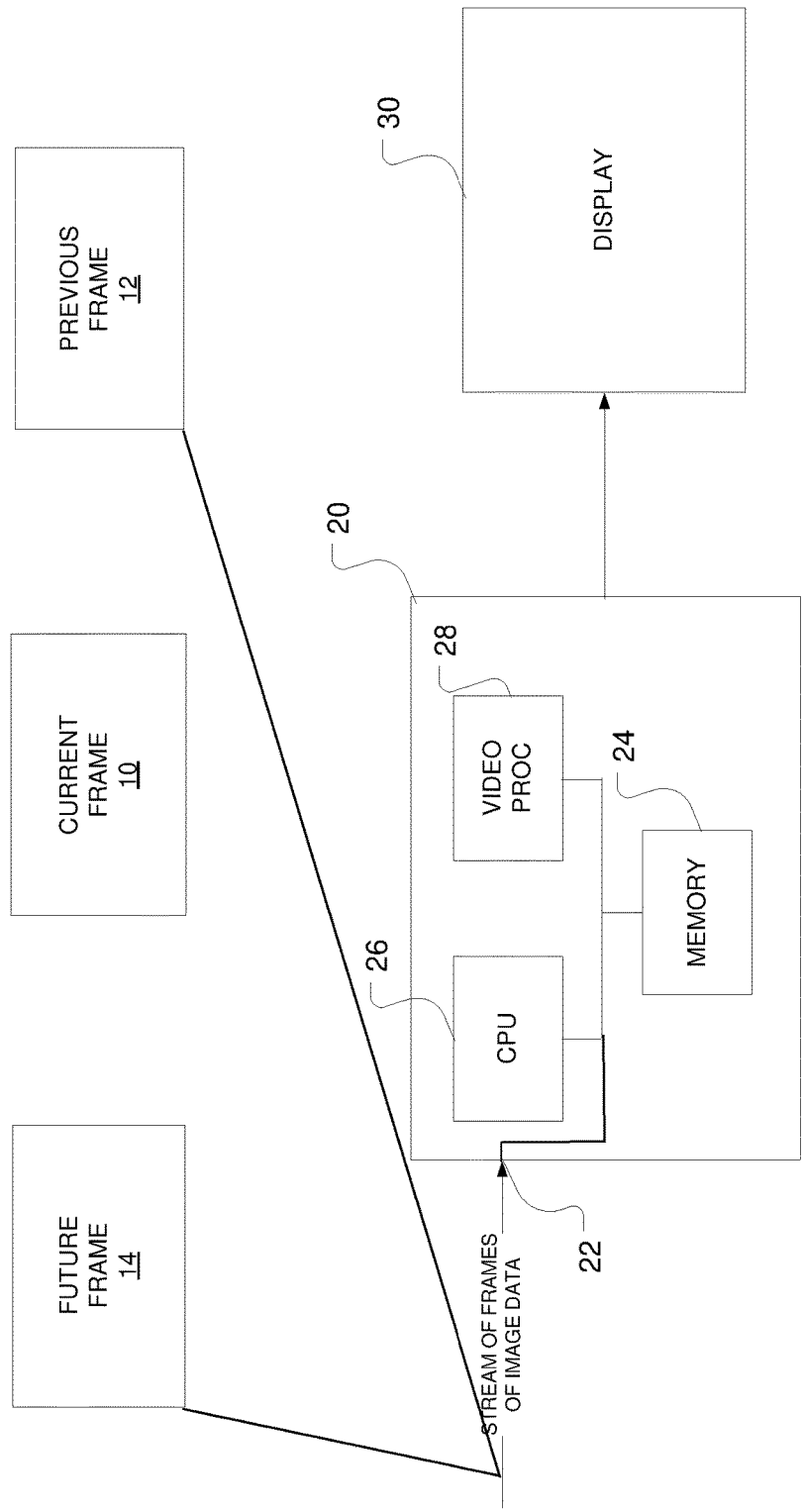
FIG. 1 shows an embodiment of a video processing and display system.

FIG. 1 shows a graphical representation of the image data and the system that processes it. In this discussion, the term 'frame' means a complete frame of image data having data for each pixel at a predetermined time common to all pixels. 'Current frame' means the frame of image data undergoing the MV smoothing process. The 'previous frame' is the frame just prior to the current frame in time, and the 'future frame' means the frame just after the current frame in time. The system may operate on the future frame as part of the processing of the current frame, as the future frame may already be in memory in the system.

Similarly, a 'block' means a defined rectangular block of pixels in a frame of image data. A 'neighborhood' or 'local window' means a predetermined set of blocks adjacent or otherwise surrounding the current block that is being processed.

The resulting image data may consist of adjusted pixels, such as pixels that have undergone noise reduction. It may consist of new pixels, produced in such processes as super resolution in which new pixels are created within a video frame, or frame interpolation/frame conversion processes, in which new pixels are created within new frames of image data.

In FIG. 1, the streams of frames of image data are shown with the current frame 10. As mentioned before, the system will typically already have the previous frame 12 and the future frame 14 in its memory or undergoing processing, as the term 'future' means relative to the current frame being processes and most systems receive and store several frames at a time.

The video system 20 receives these frames of image data through port 22 and may store some or all the frames in memory 24. The processing of the current frame may be achieved by the system central processing unit 26, or by a video processor 28 separate from the CPU. The video processor may be a processor, an application specific integrated circuit (ASIC), field programmable gate array (FPGA), or a custom set of circuit components, as examples. After the image data undergoes processing, it is sent to the display 30.

Figure 2:
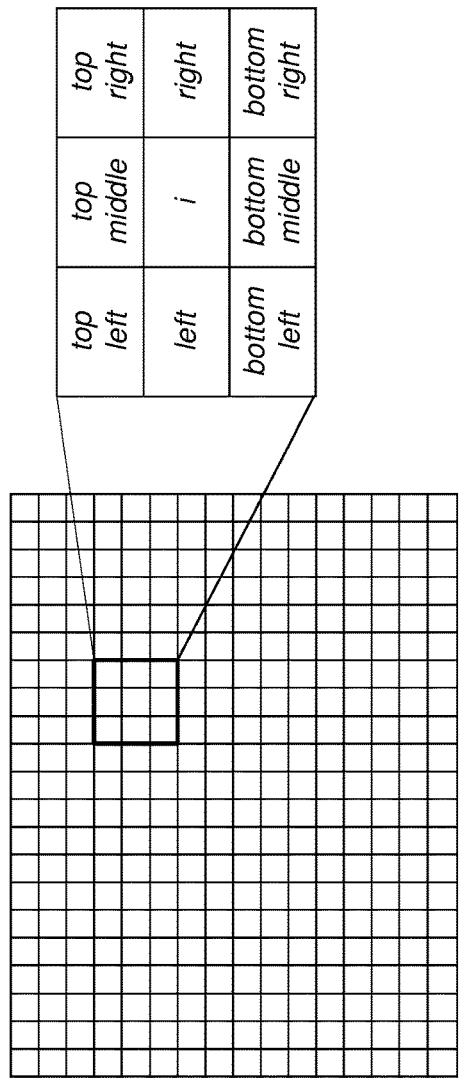
FIG. 2 shows a graphical representation of a neighborhood for a current block and its neighbor blocks.

FIG. 2 shows a graphical representation of a current block and its neighborhood. The neighborhood in this example has 9 blocks total, including the current block i. The other blocks are labeled as top-left, top-middle, top-right, left, right, bottom-left, bottom-middle, and bottom-right.

Figure 3:
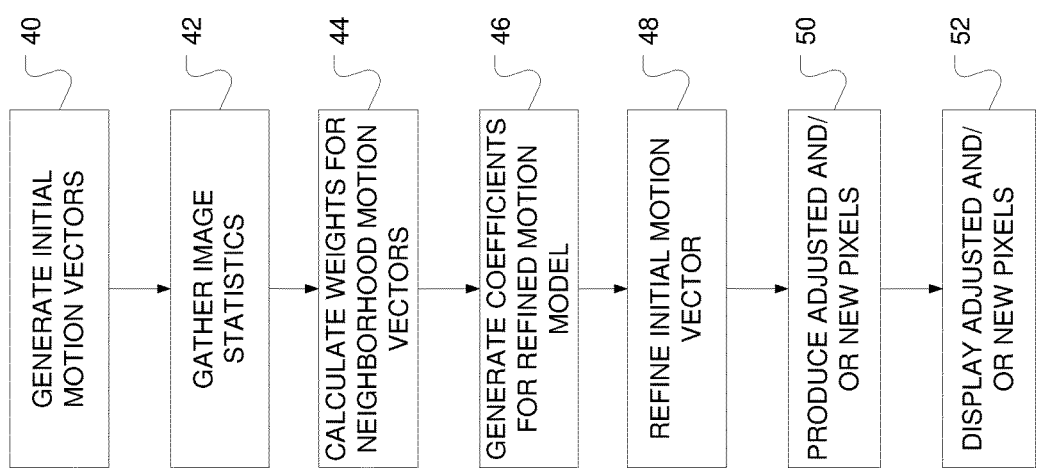
FIG. 3 shows a flow chart of an embodiment of a method to perform motion vector smoothing in a neighborhood.

FIG. 3 shows the overall process of the embodiments. An initial motion estimation process results in a set of initial motion vectors for the neighborhood at 40. The set may consist of one motion vector for every block or more than one motion vector for every block in the neighborhood. The initial motion vectors may result from any true-motion estimation process such as 3D recursive, phase plane correlation, optical flow, full search, and hierarchical search. The initial motion estimation process will be referred to here as the initial motion model.

The process also determines some characteristics of the image data for each block at 42, this may be done before, after, or during the generation of the initial motion vectors. In each block, the process determines average values and average absolute gradients for each color channel, Y, Cb, and Cr. In the following formulas, c=y, cb, cr, pc(r, s) is the pixel value of the c component at position (r, s) inside the current block, and pNum is the number of pixels inside the block. The average value is:

$$m_c = \sum_{r,s} p_c(r, s) / pNum;$$

And the average absolute gradient is:

$$avgGrad_c = \max\left(\sum_{r,s} |p_c(r+1, s) - p_c(r, s)|, \sum_{r,s} |p_c(r, s+1) - p_c(r, s)|\right) / pNum.$$

Using the initial motion vectors and the characteristics of the image data in the blocks, weights are calculated for the block motion vectors in the current block's neighborhood at 44 in FIG. 3. These weights will then be used to generate coefficients for a refined motion model to fit the motion vectors in the neighborhood at 46. The refined motion model will then be used to refine the motion vector of the current block at 48. As mentioned previously, the process uses the refined motion vectors to produce adjusted pixels, new and adjusted pixels, or new pixel, either in the same frame or in new frames, at 50. The display then displays the adjusted and/or new pixel data at 52

Typically, motion vectors in a neighborhood will probably belong to the same motion model, making it reasonable to calculate a motion model to refine the motion vector of the central block of the neighborhood. However, the possibility exists that the blocks may come from different parts of a non-rigid motion object or a different object, so the single motion model cannot describe their motion vectors. The process aims to find a motion model to best fit the motion vector of the central block. If a neighboring block comes from a different part of a non-rigid motion object or a different motion layer compared to the central block, the process should not use the motion vector from that block to calculate the motion model for the central block.

In one embodiment, the process uses the average value and the average absolute gradient of each color channel in a block to judge whether a neighboring block has image data from the same object as the image data of the central block. The difference in the previously used motion vector values helps to determine whether the object is being deformed too much.

In determining the weights of the motion vectors for blocks in the neighborhood, the process defines the central block as being at position j with characteristics or statistics of the image data of that block being $(m_c(j), avgGrad_c(j))$ and the motion vector mv(j). A neighboring block at position i has the statistics of $(m_c(i), avgGrad_c(i))$ and motion vector mv(i). The weight, $w_i$, of the motion vector for the block, also referred to as the weight of this block is:

$$w_i = (f(m_c(i) - m_c(j)c = y, cb, cr) * g(avgG\ rad_c(i) - avgGrad_c(j)c = y, cb, cr) * h(\|i-j\|^2) * l(mv(i) - mv(j)))q(mvQ_i)$$

The above formula has four parts of f, g, h, and l, which are multiplied together to get $w_i$. The first part, f, relates to the difference of the average value of pixel colors among neighboring blocks:

$$f(m_c(i) - m_c(j) | c = y, cb, cr) =$$
$$\exp\left(-\max\left(\sum_c |m_c(i) - m_c(j)| - mCoring, 0\right) \Big/ \sigma_m\right)$$

Blocks with less differences than the current block will have a larger value of f.

The second part or function, g, relates to the difference of average gradients among neighboring block:

$$g(avgGrad_c(i) - avgGrad_c(j) | c = y, cb, cr) =$$
$$\exp\left(-\max\left(\sum_c |avgGrad_c(i) - avgGrad_c(j)| - gCoring, 0\right) \Big/ \sigma_g\right)$$

Again, blocks having smaller differences between it and the current block will have larger values of g.

The h function involves the spatial distance of neighboring blocks:

$$h(\|i-j\|^2) = \exp(-\|i-j\|^2/\sigma_s^2)$$

Smaller spatial distance results in bigger values of h.

The l function involves the motion vector difference of neighboring blocks:

$$l(mv(i) - mv(j)) = \exp(-\max(|mv(i) \cdot x - mv(j) \cdot x| + |mv(i) \cdot y - mv(j) \cdot y| - lCoring, 0) / \sigma_l^2)$$

Smaller values of motion vector differences result in bigger values of l.

Finally, if more than one initial motion vector per block is generated, a weight needs to be generated based on the quality of the motion vector for that block. For example, one measure of the quality of a motion vector is the Sum of Absolute Differences (SAD) between a block of pixels in the current frame and a block of pixels pointed to by the motion vector in an adjacent frame. The SAD may have been adjusted by the amount of detail in the block and other MV statistics to normalize the quality based on the image content of the block.

$$q = \exp(-SAD_i/\sigma_q)$$

After the motion vector has been refined, all of the refined motion vectors for the block will have the same value. Therefore at that point, the number of motion vectors for a block can be reduced to 1 and the weight based on motion vector quality set to 1.

Here, mCoring, gCoring, lCoring, $\sigma_m$, $\sigma_g$, $\sigma_s$, $\sigma_l$ and $\sigma_q$ are parameters to control the weight calculation.

If a neighboring block of the current block i has a very different motion vector from the current block, the distance is larger than a threshold, the block receives a weight of 0. Essentially, the motion vector of that neighboring block will not be used to estimate the motion model. If multiple iterations occur to refine the motion model, then after the first iteration, the motion model from the previous iteration may be used to estimate the motion for each of the neighboring blocks. If the difference between the actual motion vector and the estimated motion vector is too large, it is excluded. Furthermore, because the generation of the motion model also generates an estimate of the variance between actual samples and the motion model, that variance can replace the fixed threshold. In this case, the process replaces the motion vector difference in the function l with the differences between the actual motion vector and the estimated motion vector, to provide better performance for complex motions.

To the extent that the motion vector differences can be reduced by using the differences between actual motion vectors and the predicted motion vectors, it becomes easier to separate out deforming portions of the same object. Having the ability to handle rotation improves performance so a subset of the motion models can predict the weighting. For example, the process could use the rotation plus translation motion of the full affine model instead of using a more complex and more expensive to compute projective transform or quadratic surface models.

To fit the motion model to the neighborhood, also referred to as refining the motion model, an objective function may be used. The process solves the motion model by minimizing the objective function, such as weighted least squares. In the embodiments here, three motion model fitting cases are discussed in detail. Other embodiments are of course possible, limiting the use of the model to the same object or portion of the same object by creating weights based on the average value, average absolute gradient, and the previous motion vectors.

Returning to FIG. 3, after determining the weights at 44, the motion model is fitted to the neighborhood at 46. This typically involves generating coefficients for the new motion model, referred to here as the refined motion model. The first of the three examples discussed here is and affine transform. In the below discussions, the notation ($x_i$, $y_i$) denotes the coordinates of the central pixel of block i.

The affine transform used here is defined as:

$$\begin{pmatrix} u \\ v \end{pmatrix} = \begin{pmatrix} a_{11} & a_{12} \\ a_{21} & a_{22} \end{pmatrix} \begin{pmatrix} x \\ y \end{pmatrix} + \begin{pmatrix} a_{13} \\ a_{23} \end{pmatrix};$$

Here, (x, y) is the original coordinates, and (u, v) is the corresponding coordinate after transformation, and ($a_{11}$, $a_{12}$, $a_{13}$, $a_{21}$, $a_{22}$, $a_{23}$) are affine-transform coefficients. The function for the current neighborhood is:

$$\sum_i w_i \left\| \begin{pmatrix} x_i + mv(i) \cdot x \\ y_i + mv(i) \cdot y \end{pmatrix} - \begin{pmatrix} a_{11} & a_{12} \\ a_{21} & a_{22} \end{pmatrix} \begin{pmatrix} x_i \\ y_i \end{pmatrix} - \begin{pmatrix} a_{13} \\ a_{23} \end{pmatrix} \right\|^2.$$

Let $\begin{pmatrix} u_i \\ v_i \end{pmatrix} = \begin{pmatrix} x_i + mv(i) \cdot x \\ y_i + mv(i) \cdot y \end{pmatrix}$, then it can be written into $$\sum_i w_i \left\| \begin{pmatrix} u_i \\ v_i \end{pmatrix} - \begin{pmatrix} a_{11} & a_{12} \\ a_{21} & a_{22} \end{pmatrix} \begin{pmatrix} x_i \\ y_i \end{pmatrix} - \begin{pmatrix} a_{13} \\ a_{23} \end{pmatrix} \right\|^2 =$$

$$\sum_i w_i \left\| \begin{pmatrix} u_i \\ v_i \end{pmatrix} - \begin{pmatrix} a_{11}x_i + a_{12}y_i + a_{13} \\ a_{21}x_i + a_{22}y_i + a_{23} \end{pmatrix} \right\|^2.$$

Let $$M_i = \begin{pmatrix} u_i \\ v_i \end{pmatrix},$$

$Da_{1i} = (x_i \; y_i \; 1_j)$, $Da_{2i} = (x_i \; y_i \; 1_j)$, $$Aa_1 = \begin{pmatrix} a_{11} \\ a_{12} \\ a_{13} \end{pmatrix},$$

$$Aa_2 = \begin{pmatrix} a_{21} \\ a_{22} \\ a_{23} \end{pmatrix}.$$

Then the above formula is equal to $$\sum_i w_i \|u_i - Da_{1i} Aa_1\|^2 + \sum_i w_i \|v_i - Da_{2i} Aa_2\|^2$$

Then calculate $Aa_1$, $Aa_2$ which satisfies $$\min \sum_i w_i \|u_i - Da_{1i} Aa_1\|^2$$

and $$\min \sum_i w_i \|v_i - Da_{2i} Aa_2\|^2$$

respectively.

Use least square method, $$Aa_1 = \left( \sum_i w_i Da_{1i}^T Da_{1i} \right)^{-1} \left( \sum_i w_i Da_{1i}^T u_i \right)$$

$$Aa_2 = \left( \sum_i w_i Da_{2i}^T Da_{2i} \right)^{-1} \left( \sum_i w_i Da_{2i}^T v_i \right)$$

A second embodiment uses projective transform fitting. Where the projective transform is defined as:

$$u = \frac{a_{11}x + a_{12}y + a_{13}}{a_{31}x + a_{32}y + 1}$$

$$v = \frac{a_{21}x + a_{22}y + a_{23}}{a_{31}x + a_{32}y + 1};$$

where (x, y) and (u, v) are as previously defined, and ($a_{11}$, $a_{12}$, $a_{13}$, $a_{21}$, $a_{22}$, $a_{23}$) are projective-transform coefficients. When $a_{31}$ and $a_{32}$ are zero, the model reduces to the affine transform model.

The formula is equivalent to $$u(a_{31}x + a_{32}y + 1) = a_{11}x + a_{12}y + a_{13}$$

$$v(a_{31}x + a_{32}y + 1) = a_{21}x + a_{22}y + a_{23}$$

The objective function for current neighborhood is $$\sum_i w_i \left\| \begin{pmatrix} (x_i + mv(i) \cdot x)(a_{31}x_i + a_{32}y_i + 1) \\ (y_i + mv(i) \cdot y)(a_{31}x_i + a_{32}y_i + 1) \end{pmatrix} - \begin{pmatrix} a_{11}x_i + a_{12}y_i + a_{13} \\ a_{21}x_i + a_{22}y_i + a_{23} \end{pmatrix} \right\|^2 =$$

$$\sum_i w_i \left\| \begin{pmatrix} u_i(a_{31}x_i + a_{32}y_i + 1) \\ v_i(a_{31}x_i + a_{32}y_i + 1) \end{pmatrix} - \begin{pmatrix} a_{11}x_i + a_{12}y_i + a_{13} \\ a_{21}x_i + a_{22}y_i + a_{23} \end{pmatrix} \right\|^2 =$$

$$\sum_i w_i \left\| \begin{pmatrix} u_i \\ v_i \end{pmatrix} - \begin{pmatrix} x_i & y_i & 1 & 0 & 0 & 0 & -u_i x_i & u_i y_i \\ 0 & 0 & 0 & x_i & y_i & 1 & -v_i x_i & v_i y_i \end{pmatrix} \begin{pmatrix} a_{11} \\ a_{12} \\ a_{13} \\ a_{21} \\ a_{22} \\ a_{23} \\ a_{31} \\ a_{32} \end{pmatrix} \right\|^2.$$

Let $$Dp_i = \begin{pmatrix} x_i & y_i & 1 & 0 & 0 & 0 & -u_i x_i & u_i y_i \\ 0 & 0 & 0 & x_i & y_i & 1 & -v_i x_i & v_i y_i \end{pmatrix},$$

$$Ap = \begin{pmatrix} a_{11} \\ a_{12} \\ a_{13} \\ a_{21} \\ a_{22} \\ a_{23} \\ a_{31} \\ a_{32} \end{pmatrix}.$$

Then calculate $Ap_i$ which satisfies $$\min \sum_i w_i \|M_i - Dp_i Ap_i\|^2$$

Use least square method, $$A_p = \left( \sum_i w_i Dp_i^T Dp_i \right)^{-1} \left( \sum_i w_i Dp_i^T M_i \right)$$

The third embodiment uses a quadratic surface fitting. A quadratic surface is defined as:

$$u = a_{11}x + a_{12}y + a_{13} + a_{14}xy + a_{15}x^2$$

$$v = a_{21}x + a_{22}y + a_{23} + a_{24}xy + a_{25}y^2$$

Here, (x, y) and (u, v) are defined as same as above and ($a_{11}$, $a_{12}$, $a_{13}$, $a_{14}$, $a_{15}$, $a_{21}$, $a_{22}$, $a_{23}$, $a_{24}$, $a_{25}$) are quadratic surface coefficients. One should note that $y^2$ term is not used for u and $x^2$ term is not used for v to decrease the computational cost. When coefficients multiplying the $y^2$, xy and $x^2$ terms are zero, the model reduces to that of the affine transform.

The objective function for current neighborhood is $$\sum_i w_i \left\| \begin{pmatrix} x_i + mv(i) \cdot x \\ y_i + mv(i) \cdot y \end{pmatrix} - \begin{pmatrix} a_{11}x + a_{12}y + a_{13} + a_{14}xy + a_{15}x^2 \\ a_{21}x + a_{22}y + a_{23} + a_{24}xy + a_{25}y^2 \end{pmatrix} \right\|^2 =$$

$$\sum_i w_i \left\| \begin{pmatrix} u_i \\ v_i \end{pmatrix} - \begin{pmatrix} a_{11}x_i + a_{12}y_i + a_{13} + a_{14}x_iy_i + a_{15}x_i^2 \\ a_{21}x_i + a_{22}y_i + a_{23} + a_{24}x_iy_i + a_{25}y_i^2 \end{pmatrix} \right\|^2 =$$

$$\sum_i w_i |u_i - (a_{11}x_i + a_{12}y_i + a_{13} + a_{14}x_iy_i + a_{15}x_i^2)|^2 +$$

$$\sum_i w_i |v_i - (a_{21}x_i + a_{22}y_i + a_{23} + a_{24}x_iy_i + a_{25}y_i^2)|^2 =$$

$$\sum_i w_i \left\| u_i - (x_i \ y_i \ 1 \ x_iy_i \ x_i^2) \begin{pmatrix} a_{11} \\ a_{12} \\ a_{13} \\ a_{14} \\ a_{15} \end{pmatrix} \right\|^2 +$$

$$\sum_i w_i \left\| v_i - (x_i \ y_i \ 1 \ x_iy_i \ y_i^2) \begin{pmatrix} a_{21} \\ a_{22} \\ a_{23} \\ a_{24} \\ a_{25} \end{pmatrix} \right\|^2.$$

Let $$Ds_{1i} = (x_i \ y_i \ 1 \ x_iy_i \ x_i^2),$$

$$Ds_{2i} = (x_i \ y_i \ 1 \ x_iy_i \ y_i^2),$$

$$As_1 = \begin{pmatrix} a_{11} \\ a_{12} \\ a_{13} \\ a_{14} \\ a_{15} \end{pmatrix},$$

$$As_2 = \begin{pmatrix} a_{21} \\ a_{22} \\ a_{23} \\ a_{24} \\ a_{25} \end{pmatrix}.$$

Then the above formula is equal to $$\sum_i w_i \|u_i - Ds_{1i} As_1\|^2 + \sum_i w_i \|v_i - Ds_{2i} As_2\|^2$$

Then calculate $As_1$ and $As_2$ which solve $$\min \sum_i w_i \|u_i - Ds_{1i} As_1\|^2$$

and $$\min \sum_i w_i \|v_i - Ds_{2i} As_2\|^2$$

respectively.

Use least square method, $$As_1 = \left( \sum_i w_i Ds_{1i}^T Ds_{1i} \right)^{-1} \left( \sum_i w_i Ds_{1i}^T u_i \right)$$

and $$As_2 = \left( \sum_i w_i Ds_{2i}^T Ds_{2i} \right)^{-1} \left( \sum_i w_i Ds_{2i}^T v_i \right).$$

After getting the fitted motion model for a block, the process recalculates the motion vector for the current block. Suppose (x, y) is coordinate of central pixel of this block. The motion vector refinement may depend upon the model used to determine the motion model. For example, the motion vector refinement using affine-transform model may take the form of:

$$\begin{pmatrix} rmv \cdot x \\ rmv \cdot y \end{pmatrix} = \begin{pmatrix} a_{11} & a_{12} \\ a_{21} & a_{22} \end{pmatrix} \begin{pmatrix} x \\ y \end{pmatrix} + \begin{pmatrix} a_{13} \\ a_{23} \end{pmatrix} - \begin{pmatrix} x \\ y \end{pmatrix}.$$

The term rmv is the refined motion vector.

The projective-transform model determines the refined motion vector rmv as:

$$rmv \cdot x = \frac{a_{11}x + a_{12}y + a_{13}}{a_{31}x + a_{32}y + 1} - x$$

$$rmv \cdot y = \frac{a_{21}x + a_{22}y + a_{23}}{a_{31}x + a_{32}y + 1} - y.$$

The quadratic surface model determines the refined motion vector rmv as:

$$rmv \cdot x = a_{11}x + a_{12}y + a_{13} + a_{14}xy + a_{15}x^2$$

$$rmv \cdot y = a_{21}x + a_{22}y + a_{23} + a_{24}xy + a_{25}y^2.$$

Having discussed the derivation of refined motion models, the discussion now turns to selecting the motion model. Many factors may affect the selection. For example, one criteria for selection may involve consideration of computational costs, or the needs of the system being designed. The lowest-cost model is the affine-transform. To obtain a high-quality motion vector field, and there is a high enough number of samples with a weight larger than a threshold, projective transform or quadratic surface may be used. If the number of samples with a high enough weight is not big enough, affine-transform would be used. If the affine-transform matrix is not sufficient, a weighted average of motion vectors in the neighborhood could be used.

In another embodiment, where computational costs are not a consideration, the process may take an iterative approach. First, weighted affine-transform is computed and it is used to remove some outlier motion vectors. The weights are then recalculated. The projective-transform uses these new weights, if the number of samples with appropriate weight is large enough. The weighted quadratic surface model may also be computed if the number of samples with the appropriate weight is large enough. The refined motion model with the least fitting error will be sued to generate a new motion vector for the current block.

Another approach information related to the neighboring blocks could be used such that it will not be quite as exhaustive or complex. For example, neighboring blocks have similar or the same motion model in many images. The process processes the image blocks shown in FIG. 2 in a top to bottom and left to right scan order. For the block i, the left, top-left, top-middle, and top-right blocks in its 3×3 block neighborhood have undergone processing and their respective motion models have been determined. The process can then compute the similarity between block i and each of those blocks and find similar blocks in which the similarity is larger than a predetermined threshold. The similarity is calculated by f*g, according to the differences of average value and differences of average gradients compared with block i.

If the number of most similar blocks is larger than 1, then the process will select the block with the smallest fitting error from them as the unique most similar block. If the similarity is big enough, the process uses the motion model of the unique most similar block to compute weights for each neighboring block of block I and remove outlier block motion vectors. The process then recalculates the motion vectors for block i, whose type is the same as that of the motion model of the unique most similar block. If the similarity is not big, use the same approach discussed above. One can simplify the calculation of the weights to use based on the previous motion model, but may only use a subset of the more complex models. The affine model makes up a subset of both the projective transform and the quadratic surface models.

For a block at position i, an appropriate motion model is computed. Commonly, this motion model is used to refine this block's motion vector. Fortunately, if a neighboring block j in a 3×3 neighborhood of block i has a big weight relative to block i, meaning that this block has a similar or same motion model as block i, it is reasonable to refine the motion vector of block j using the motion model for block i. Assuming that the image blocks are processed in a top to bottom and left to right scan order, current block i can refine motion vectors of itself and the right, bottom-left, bottom-middle, and bottom-right neighboring blocks show in FIG. 2. This would occur according to their weights relative to block i. For each of the blocks, the existing motion vector is blended with the estimated motion vector. The existing motion vector has weight $(1-w_i(j))$ and the model motion vector has weight equal to wi(j).

In this embodiment, the process does not use the block i motion model to refine the motion vectors of the left, top-left, top-middle, top-right blocks to decrease the computational cost and memory space. However, the center block motion vector can be further refined by use of average weighting of the 5 motion vectors computed by motion models of itself, left, top-left, top-middle, top right blocks shown in FIG. 2. The formula is:

$$rmv(i) = (w_i(i)*rmv_i(i) + w_{lf}(i)*rmv_{lf}(i) + w_{tl}(i)*rmv_{tl}(i) + w_{tm}(i)*rmv_{tm}(i) + w_{tr}(i)*rmv_{tr}(i))/(w_i(i) + w_{lf}(i) + w_{tl}(i) + w_{tm}(i) + w_{tr}(i)).$$

In the above, $w_j(i)$, $rmv_j(i)$ are the weight and refined motion vector for block i respectively relative to central block i, in the formula j is equal to i for the center, lf for the left, tl for the top-left, tm for the top-middle, and tr for the top right blocks.

One modification could include the weighted motion model fitting, also referred to as the generation of the refined motion model coefficients, as an iterative process. Different iterations could use different scan orders, such as the even numbered iterations using top to bottom, left to right, and the odd numbered iterations could process in a bottom to top, right to left scan order. The next iteration could use the motion model of the previous iteration as its initial motion model in the process set out above.

In this manner, stable and smooth local motion vectors are provided to further processing of the image data prior to display, as part of a super resolution, frame interpolation, noise-reduction, or other process. Once the refined motion vector for a block is determined, the refined motion vector and the pixel data from the stream of frames of image data is used to produce adjusted pixels, new pixels, or new and adjusted pixels of image data for display.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of producing video data, comprising:
   receiving, at a processor, a current frame of image data in a stream of frames of image data;
   dividing a current frame of image data into blocks;
   identifying a current block and defining a neighborhood of blocks for the current block;
   generating at least one initial motion vector for each block;

using the initial motion vector for current block and an initial motion model to calculate a weight for each initial motion vector in the neighborhood based on a difference between initial motion vector for the current block and the initial motion vector for at least one other block from the current block in the neighborhood and differences in the image data between the current block and the other blocks in the neighborhood;

using the weights for each initial motion vector to generate coefficients for a refined motion model;

refining the initial motion vector for the current block according to the refined motion model to produce a refined motion vector;

using the refined motion vector and the pixels in the stream of frames to produce at least one of adjusted pixels and new pixels; and displaying the at least one of adjusted pixels and new pixels on a display.

2. The method of claim 1, further comprising repeating the method at least twice for each block.

3. The method of claim 1, wherein using the refined motion vector and the pixels in the stream of frames produces new pixels in a super resolution process.

4. The method of claim 1, wherein using the refined motion vector and the pixels in the stream of frames produces new frames of new pixels.

5. The method of claim 1, wherein using the refined motion vectors and the pixels in the stream of frames produces adjusted pixels in a noise reduction process.

6. The method of claim 1, wherein generating an initial motion vector for each block in the neighborhood comprises using one of three-dimensional recursive motion estimation, phase plane correlation, optical flow, full search, and hierarchical search.

7. The method of claim 1, wherein calculating the weight for the initial motion vectors comprises:

determining if data in each neighborhood block is data of a same object represented by data in the current block; and weighting the initial motion vector for each neighborhood block based upon the determining.

8. The method of claim 7, wherein determining if data in each neighborhood block is data of a same object represented by data in the current block comprises comparing the current block to the neighborhood block and using at least one of differences in average colors, differences in gradient, differences in motion vectors, and spatial distance.

9. The method of claim 1, wherein the neighborhood block is assigned a zero weight if a difference between the motion vector for the current block and the motion vector for the neighborhood block exceeds a threshold.

10. The method of claim 1, wherein the initial motion model comprises a translation motion model based on the initial motion vector of the current block.

11. The method of claim 1, wherein the initial motion model comprises a motion model used for a previous iteration for the current block.

12. The method of claim 1, wherein the initial motion model comprises a motion model that was previously determined in a neighboring block.

13. The method of claim 1, wherein the refined motion model comprises one of affine transform, projection transform, and quadratic transform.

14. The method of claim 1, wherein refining the initial motion vector comprises recalculating a motion vector for the current block using the refined motion model.

15. The method of claim 1, further comprising using the refined motion model as the initial motion model for blocks following the current block and adjacent to the current block that have the weight of the motion vector above a threshold.

16. The method of claim 1, wherein refining the initial motion vector comprises using a weighted average of motion models for the other blocks in the neighborhood.

* * * * *